US006988185B2

(12) United States Patent
Stark, IV et al.

(10) Patent No.: US 6,988,185 B2
(45) Date of Patent: Jan. 17, 2006

(54) SELECT-FREE DYNAMIC INSTRUCTION SCHEDULING

(75) Inventors: Jared W. Stark, IV, Portland, OR (US); Mary D. Brown, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 523 days.

(21) Appl. No.: 10/055,483

(22) Filed: Jan. 22, 2002

(65) Prior Publication Data

US 2003/0140216 A1    Jul. 24, 2003

(51) Int. Cl.
G06F 9/30    (2006.01)
(52) U.S. Cl. ..................................... 712/214
(58) Field of Classification Search ............... 712/214, 712/215, 216, 217
See application file for complete search history.

(56) References Cited

PUBLICATIONS

Hennessy and Patterson, "Computer Architecture—A Quantitative Approach, 2nd Edition," 1996, pp. 242-247.*
Ramon Canal et al., "A Low-Complexity Issue Logic", ICS 2000 Santa Fe, New Mexico, pp. 327-335.
James A. Farrell et al., "Issue Logic for a 600-MHz Out-of-Order Execution Microprocessor", IEEE 1998, pp. 707-712.
Dana S. Henry et al., "Circuits for Wide-Window Superscalar Processors", ISCA 2000 Vancouver BC Canada, pp. 236-247.
Glenn Hinton et al., "The Mircroarchitecture of the Pentium® 4 Processor", Intel Technology Journal Q1, 2001, pp. 1-13.

Pierre Michaud et al., "Data-Flow Prescheduling for Large Instruction Windows in Out-of Order Processors", IEEE 2001, pp. 27-36.
Enric Morancho, et al, "Recovery Mechanism for Latency Misprediction", IEEE 2001, pp. 118-128.
Soner Önder et al., "Superscalar Execution With Dynamic Data Forwarding", Department of Computer Science, University of Pittsburgh.
Subbarao Palacharla et al., "Complexity-Effective Superscalar Processors", ISCA 1997, pp. 206-218.
Jared Stark et al., "On Pipelining Dynamic Instruction Scheduling Logic", Intel Corporation, The University of Texas at Austin, Dec. 2000.
Shlomo Weiss et al., "Instruction Issue Logic For Pipelined Supercomputers", IEEE 1984, pp. 110-118.
Kenneth C. Yeager, "The MIPS R10000 Superscalar Microprocessor", IEEE Micro 1996, pp. 28-40.
Michael Butler et al., "An Investigation of the Performance of Various Dynamic Scheduling Techniques", in Proceedings of the 25th Annual ACM/IEEE International Symposium on Microarchitecture, 1992, pp. 1-9.

(Continued)

*Primary Examiner*—Eddie Chan
*Assistant Examiner*—David J. Huisman
(74) *Attorney, Agent, or Firm*—Fish & Richardson P.C.

(57) ABSTRACT

A processor having select-free scheduling separates the wakeup and select logic into two loops. A wakeup loop holds scheduler instructions including unexecuted instructions, and indicates which of the unexecuted instructions may be ready to be executed. At least one of the unexecuted instructions is to wakeup and notify at least another of the unexecuted instructions to speculatively wakeup. A select loop selects at least one of the indicated ready instructions for execution.

38 Claims, 5 Drawing Sheets

PUBLICATIONS

Anantha Chandrakasan et al., "Design of High-Performance Microprocessor Circuits", IEEE Press, 2001.

IA-32 Intel Architecture Software Developer's Manual vol. 1: Basic Architecture, Intel Corporation, 2001.

John Paul Shen, "Replenishing the Microarchitecture Treasure Chest", Carnegie-Mellon University, 1999.

James E. Thornton, "Design of a Computer: The Control Data 6600", Foresman Press, 1970.

R.M. Tomasulo, "An efficient algorithm for exploring multiple arithmetic units", IBM Journal of Research and Development, vol. 11, pp. 25-33, Jan. 1967.

* cited by examiner

SELECT-FREE DYNAMIC INSTRUCTION SCHEDULING

TECHNICAL FIELD

This invention relates to processors, and more particularly to processor scheduling schemes.

BACKGROUND

Processor performance has increased a thousand-fold over the past twenty years. Much of this increase is due to deeper pipelines, which enable greater exploitation of parallelism. Over the past several decades, pipeline depths have grown, allowing processors to exploit more and more parallelism, and to achieve higher and higher performance. However, the further use of parallelism in processors by increasing pipeline depths has become problematic. Critical loops within processors now present a significant and growing obstacle to further increases in pipelining. Critical loops are sections of logic that typically must evaluate in a single cycle to meet Instructions Per Cycle (IPC) performance goals. One such critical loop is the wakeup and select (i.e., dynamic instruction scheduling) logic.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
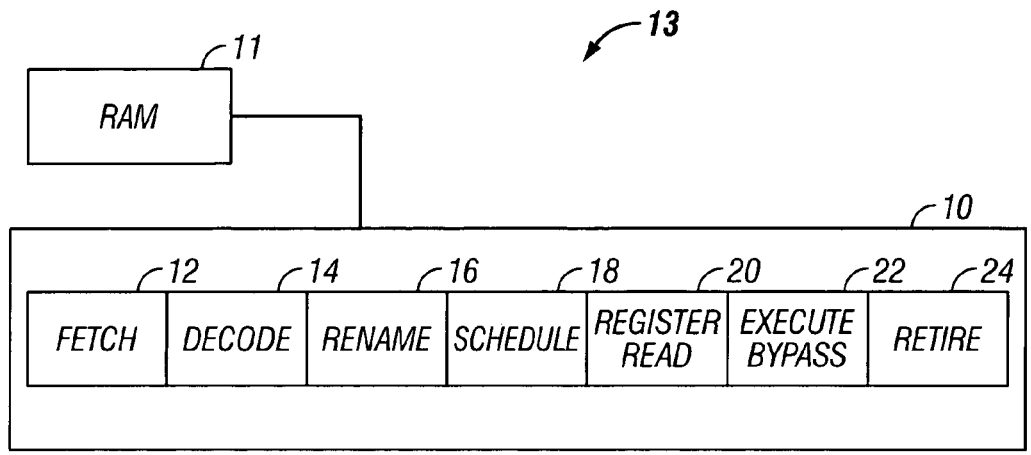
FIG. 1 shows a computer system that includes a select-free scheduler.

FIG. 1 shows a computer system 13 including read and write memory (RAM) 11 coupled to an embodiment of a processor 10 in accordance with the teachings of the invention. The processor 10 may use select-free scheduling logic to break the scheduling loop into two smaller loops; a loop for wakeup and a loop for select.

The processor 10 may be a superscalar, out-of-order microprocessor. The processor 10 is functionally shown by a pipeline diagram that illustrates a pipeline organization comprised of several stages. The first two stages may be a fetch stage 12 and a decode stage 14. In the fetch and decode stages 12 and 14, instructions are fetched and decoded. The instruction cache and branch predictor may reside in the fetch and decode stages 12 and 14. A rename stage 16 and schedule stage 18 are described in detail below. The remainder of the pipeline may comprise a register file read stage 20, execute/bypass stage 22, and retirement stage 24. Some stages of the pipeline may require more than one cycle. Other pipeline organizations may also be employed, so long as a scheduler is included in the pipeline organization.

Rename Stage

The rename stage 16 may assign a new physical register to destination operands, and map source operands of subsequent instructions onto the corresponding physical registers. The rename stage 16 determines whether the source operands needed by an instruction currently reside in the physical register file, or whether the instruction needs to wait for another instruction in the scheduling window to produce the operand. The rename stage 16 outputs the physical register number of the source operand. As the rename stage 16 determines dependencies in terms of physical register numbers, it may also calculate the dependencies in terms of scheduler entry numbers.

Scheduling Window

Figure 2:
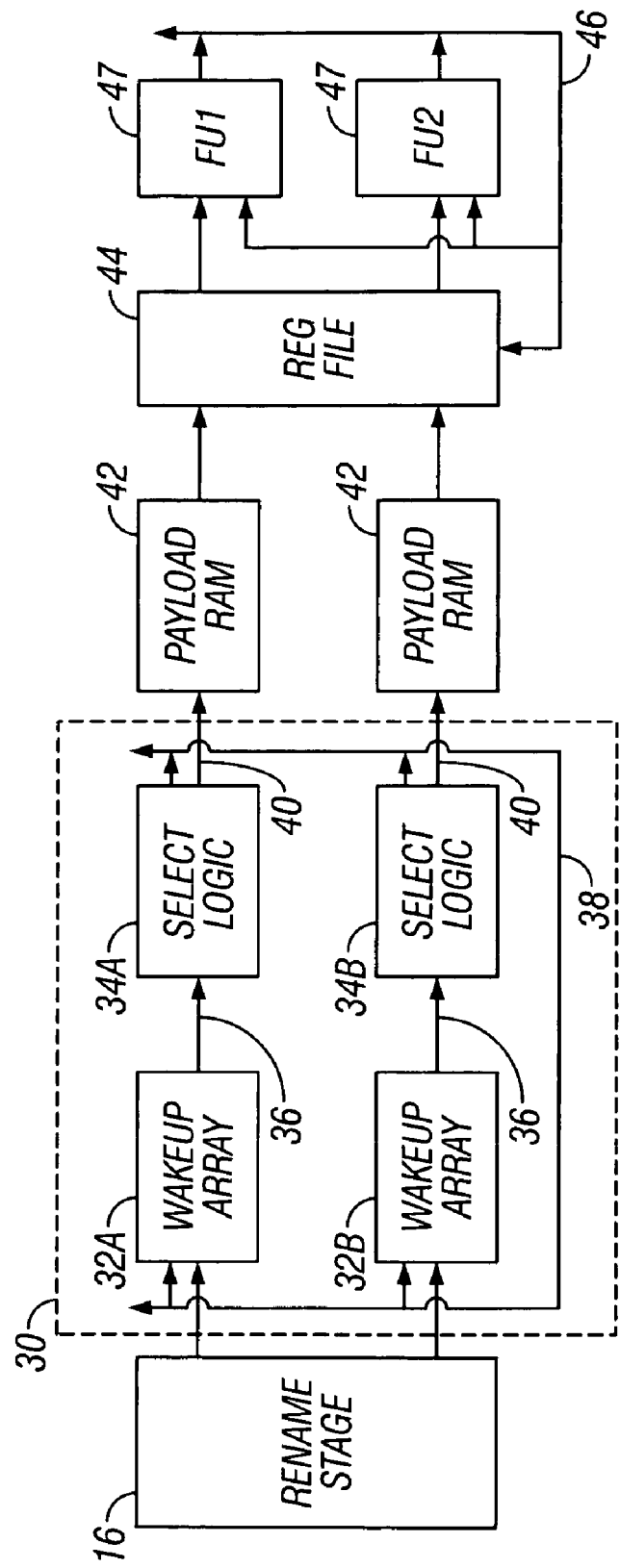
FIG. 2 shows an execution core that includes a baseline scheduler.

FIG. 2 shows the main structures that make up the out-of-order portion of a baseline execution core. The structure and operation of the baseline execution core will first be explained before describing an execution core with a select-free schedule stage 18.

After instructions are renamed, they may be placed in a baseline scheduler 30. The scheduler 30 is responsible for issuing instructions to the execution units when the required resources (source operands and execution units) are available. The scheduler 30 may be primarily comprised of the wakeup arrays 32a and 32b and the select logic 34a and 34b. The wakeup arrays 32a and 32b may hold executed instructions as well as instructions that have not executed. The select logic 34a and 34b picks instructions for execution. Typically, each wakeup array 32a and 32b feeds a separate select logic circuit 34a and 34b.

Within the wakeup arrays 32a and 32b, wakeup logic (not shown) monitors the resource dependencies for instructions to determine if they are ready to execute. In general, as resources become ready, multiple instructions may be woken up in any given clock. The wakeup logic sends the select logic 34a and 34b a Request vector 36 indicating which instructions are ready for execution.

The Select Logic

The select logic 34a and 34b may pick an instruction 40 from instructions marked in the Request Vector 36 for execution on a given functional unit. In conventional microprocessor designs, the select logic 34a and 34b typically contains a prioritizer that picks the oldest instructions from the Request Vector 36. The select logic 34a and 34b outputs a Grant vector 38 indicating the selected instructions. The grant vector 38 in turn becomes an input to the wakeup logic in the next clock, causing the dependents of the previously picked instruction 40 to wake up. Hence the conventional scheduling stage is a loop: instructions that are ready to be scheduled in the current clock produce results which are fed to dependent instructions that may be scheduled in the following clock (or some number of clocks in the future depending on execution latency). The need to prioritize all ready instructions adds to the delay in the scheduling loop. By removing prioritization and performing selection in a subsequent stage, the scheduler loop can be made to run at a significantly higher frequency.

Payload RAM and Register File

After an instruction 40 is selected for execution, the payload of the instruction 40 is obtained from a table in the payload RAM 42. The payload is information needed for the register file access and execution of the instruction 40. The information may include instruction opcode and the physical register identifiers of the sources and destination of the instruction 40.

Execution and Scheduling Window Deallocation

After an instruction 40 has been granted execution, the instruction 40 is deallocated from the wakeup array 32a or 32b. However, the instruction 40 remains in the instruction window until it retires. By holding only a subset of the instructions from the instruction window in the wakeup arrays 32a and 32b, the wakeup arrays 32a and 32b can be built smaller, which reduces the scheduling latency. When the instruction 40 is deallocated, the rename mapper is updated to indicate that the dependents of the instruction should get the result from the register file 44 rather than the bypass network 46.

Because not all functional units 47 may execute all instructions, an instruction may be steered to the wakeup array 32 for a particular functional unit 47 on which the instruction can execute. Any method of steering instructions may be employed including using a switch before the issue stage and using a trace cache that can reorder the instructions.

Baseline Scheduling Logic

Figure 4:
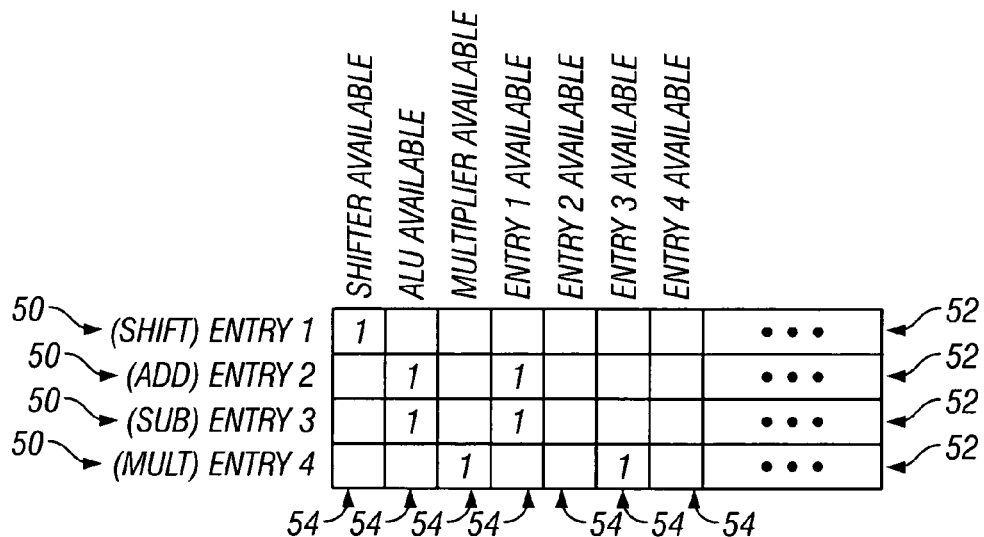
FIG. 4 shows a wakeup array.
Figure 3:
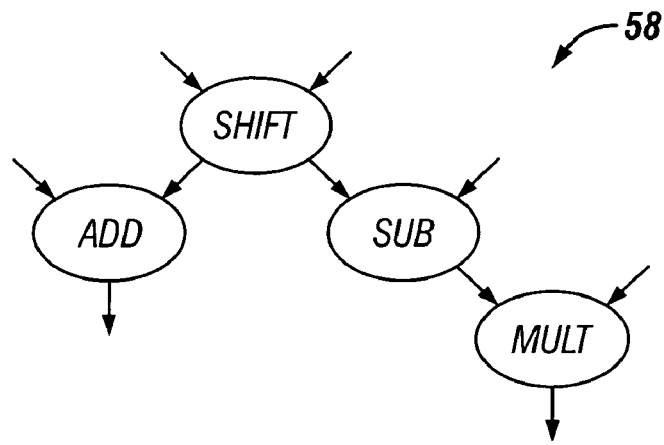
FIG. 3 shows a dependency graph associated with FIG. 4.
Figure 5:
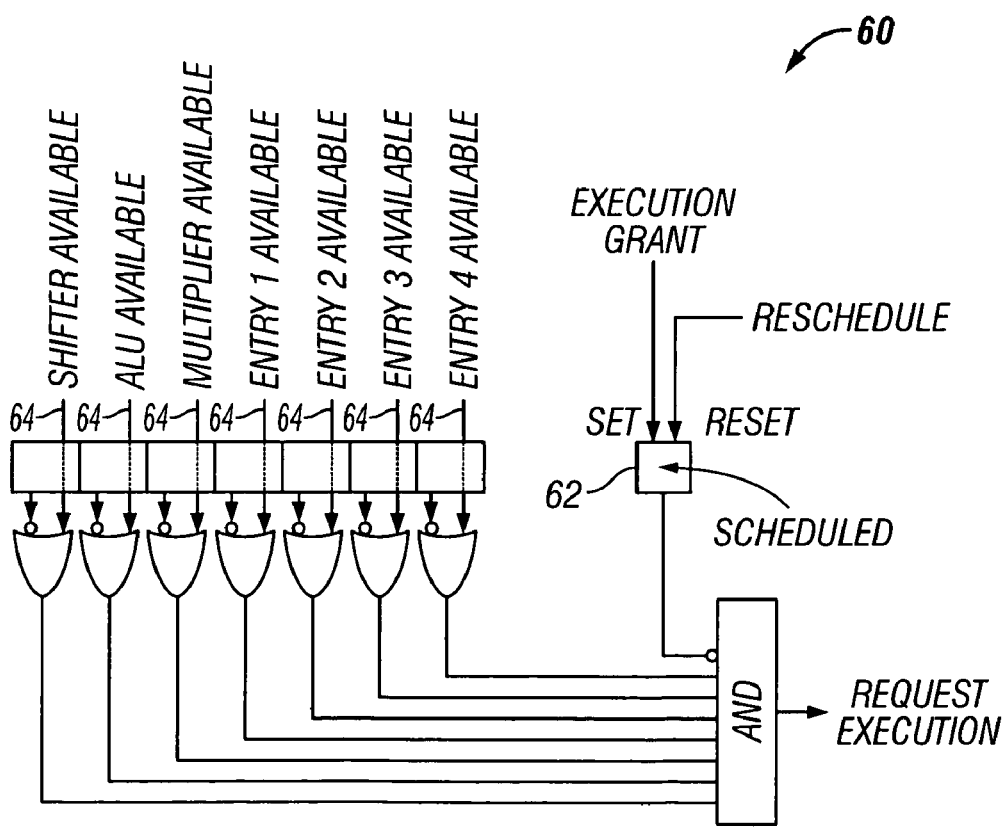
FIG. 5 shows wakeup logic.

FIGS. 3–5 show the baseline scheduling logic in greater detail. The scheduling logic may be comprised of wakeup arrays 32, selectors 34, and countdown timers (not shown). As shown in FIG. 4, each wakeup array entry 50 preferably contains the wakeup logic for a single instruction. The wakeup logic may be implemented with wire-OR-style wakeup logic as well as CAM-style wakeup logic. Each entry 50 may contain a bit vector, called a Resource Vector 52, that indicates which resources the instruction needs. Each bit position, or Resource Bit 54, within the Resource Vector 52 corresponds to a particular resource. A resource can be either a result operand produced by the instruction in a particular entity of a wakeup array 32, or a particular functional unit. Each Resource Bit 54 is set if the instruction requires that resource, and reset if the instruction does not.

FIGS. 3 and 4 show a dependency graph 58 and an example of a wakeup array 32 that contains the instructions in the graph. The portion of the wakeup array 32 that is shown has four Resource Vectors 52 with seven Resource Bits 54. The instructions in the wakeup array entries are the SHIFT, SUB, ADD, and MULT instructions from the dependency graph. In this example, the instructions that produced the values for the unspecified source operands of the SHIFT, SUB, ADD, and MULT instructions have already executed, so their result values reside in the register file 44. The SHIFT instruction only requires the shifter, so only one Resource Bit 54 is set. The SUB and ADD instructions depend on the result of the SHIFT and require the ALU. The MULT instruction depends on the result of the SUB and requires the multiplier.

FIG. 5 shows the wakeup logic 60 for one wakeup array entry 50. The AVAILABLE lines 64 running vertically pass through every entity in the array 32. Each line corresponds to a Resource Bit 54 in the Resource Vector 52. The line is high if the resource is available and low if it is not. The SCHEDULED bit 62 indicates whether or not the instruction has been granted execution. There may be a number of cycles between the time the instruction is granted execution and the time the instruction is actually de-allocated from the wakeup array 32. During this time, the SCHEDULED bit 62 is set to prevent the instruction from requesting execution again. If the instruction is rescheduled, for example, due to a load latency misprediction, the SCHEDULED bit 62 is reset by asserting the Reschedule line. The instruction requests execution if 1) the SCHEDULED bit is not set, and 2) for each resource, the instruction does not require that resource or that resource is available. The AND gate may be implemented using a wire-OR structure to make it fast. Hence this style of wakeup logic is called wire-OR-style.

The select logic 34 may be a priority circuit. The input is a bit vector indicating which instructions from the wakeup array 32 request execution. One of the outputs of the select logic 34 is the Grant Vector 38, indicating which instructions receive the execution grants. The wakeup array 32 uses the Grant Vector 38 to set the SCHEDULED bits 62. The other outputs are a set of one-hot bit vectors. The first one-hot specifies the first instruction that received an execution grant. The second one-hot specifies the second instruction that received an execution grant. And so on. For a select-1 priority circuit, there is only 1 one-hot vector, and it may be equivalent to the Grant Vector 38. Each one-hot is used to access a port of a Payload RAM 42 and deliver the payload for the associated instruction to the register file 44 and to a functional unit, FU, 47. The one-hot may be the set of word lines for the Payload RAM 42, so that the Payload RAM 42 does not require a word decoder.

After an instruction receives an execution grant, the AVAILABLE lines for the associated wakeup array entries 52 are asserted so that the dependent instructions may wake up. For a single-cycle instruction, the AVAILABLE line may be asserted immediately. For an N-cycle instruction, the AVAILABLE line may be asserted N–1 cycles later. This may be accomplished by using a countdown timer initialized to the latency of the instruction. When an instruction receives an execution grant, the timer begins to count down. When the timer completes the countdown, the AVAILABLE line of the instruction may be asserted.

With wire-OR wakeup logic, data dependencies may be specified in terms of wakeup array entries 52 rather than physical register identifiers. When the wakeup array entry 52 of an instruction is de-allocated, the instruction may still have dependent instructions residing in the wakeup arrays 32. In order to prevent an incorrect dependence on a new instruction that gets allocated to the same entry, when the entry is deallocated, every wakeup array entry 52 in the scheduling window may clear the Resource Bit 54 that corresponds to the deallocated entry.

Select-Free Scheduling Logic

Figure 6:
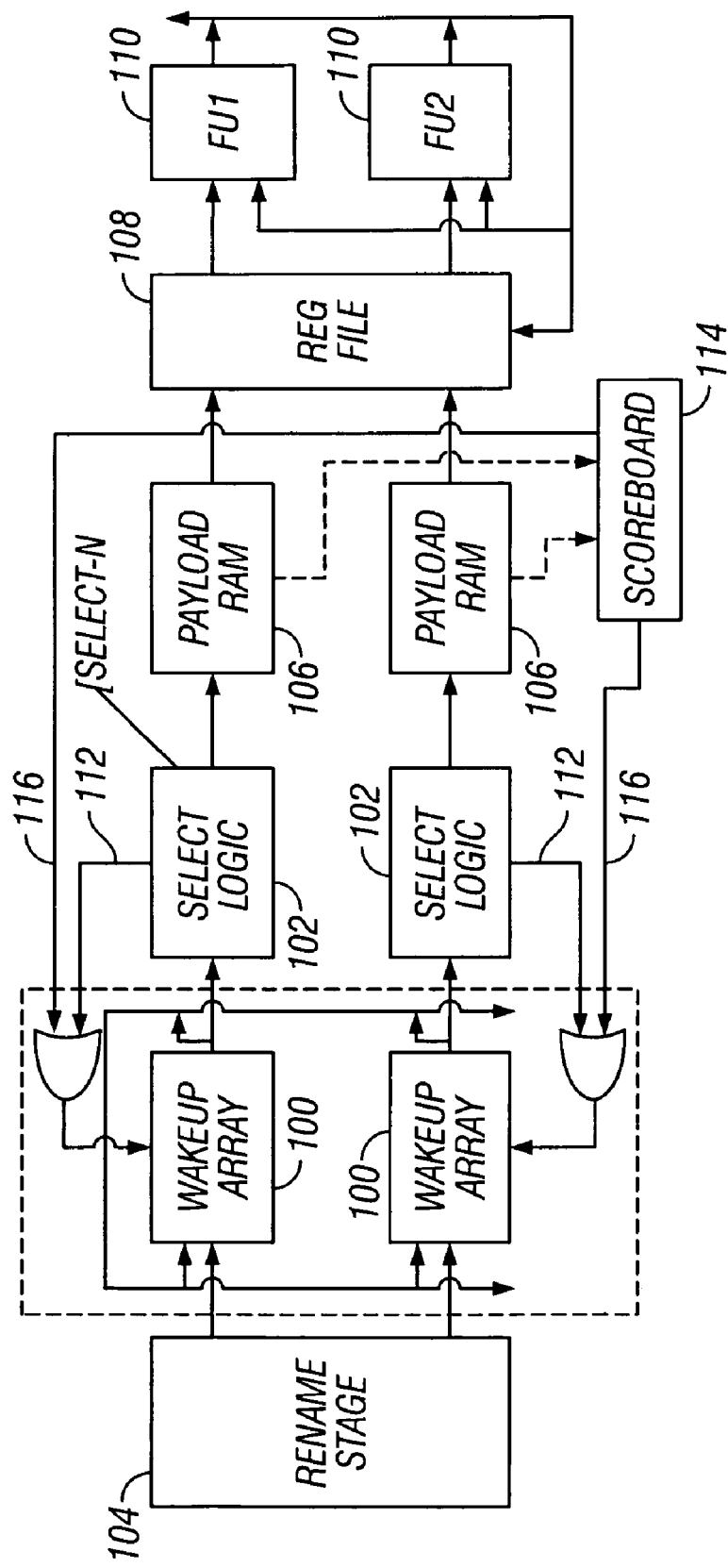
FIG. 6 shows an execution core that includes a select-free scheduler.

FIG. 6 shows an execution core including a select-free scheduler 18. The select-free scheduler 18 includes a wakeup-array 100 having wakeup logic that may be the same as for baseline scheduling logic. With select-free scheduling logic, an instruction speculates that it will be selected for execution. The instruction asserts the AVAILABLE lines for its wakeup array entries before selection of the instruction is confirmed. For simplicity, only an implementation for single-cycle instructions is described, although it is also possible to implement select-free schedulers for multi-cycle instructions.

The invention recognizes that in a given wakeup array, usually no more than one instruction becomes ready per cycle. Simulations show that a 16-entry wakeup array in a machine with 8 select-1 schedulers has, on average, no waking instructions in 53% of the cycles (including branch recovery cycles), one waking instruction in 39% of the cycles, and two or more waking instructions in the remaining 8% of the cycles. Because there is usually no more than one instruction per wakeup array requesting execution, it is possible to speculate that any waking instruction will be selected for execution. Select-free scheduling logic exploits this fact by removing the select logic 102 from the critical scheduling loop and scheduling instructions speculatively. The select logic 102 is instead used to confirm that the schedule is correct. By breaking this loop, the processor cycle time is no longer set by the time required for wakeup and select, but is instead set just by the time required for wakeup.

The execution core includes a rename stage 104, payload RAMS 106, register file 108, and functional units 110 that are similar in function and operation to components associated with the baseline scheduler 30.

Collisions and Pileups

A collision is the scenario where more instructions wakeup than can be selected, resulting from an incorrect speculation by at least one instruction: any unselected instructions assert their AVAILABLE lines too early. These unselected instructions are called collision victims. Collision victims may be identified at the same time an instruction is selected. For example, when a Grant Vector is produced, a collision victim vector 112 may also be produced. Dependents of the collision victims may also wake up before they are really ready to be scheduled, thus entering the scheduling pipeline too early. We call these instructions pileup victims. Pileup victims may be identified by a scoreboard check before the execute stage.

Select-Free Scheduling Implementation

With select-free scheduling, an instruction assumes it will be selected when it wakes up. Hence, once an instruction is awakened, it may immediately set its SCHEDULED bit and assert its AVAILABLE line. Similar to in the baseline scheduler 30, the select logic 102 produces a set of one-hot vectors that are used to index the Payload RAM 106, but it also produces a Collision Victim vector 112 indicating which requesting instructions did not receive an execution grant. An instruction that is selected is not necessarily really ready for execution because it may have been a pileup victim.

To check for pileup victims, a scoreboard 114 may be placed before the functional units 110 to record which instructions have been correctly scheduled. For example, if the scoreboard 114 is placed after the Payload RAM 106, the scoreboard 114 may be accessed in parallel with the register file 108, and does not add a pipeline stage. An instruction reads the scoreboard 114 to determine if the instructions that produce its sources have been correctly scheduled. If all have been correctly scheduled, the instruction records in the scoreboard 114 that it was correctly scheduled. Otherwise, the instruction is a pileup victim and does not update the scoreboard 114. The scoreboard 114 may generate a pileup victim vector 116 to indicate pileup victims.

When an instruction is identified as a collision or pileup victim, the SCHEDULED bit of its wakeup array entry should be reset so that the instruction will be rescheduled. The pileup victim vector 116 may be ORed with the Collision Victim vector 112 produced by the select logic 102 to indicate which Reschedule lines should be asserted. Instructions should not be deallocated from the wakeup entries until they have passed the scoreboard check.

When a machine uses a combination of baseline and select-free schedulers, only the select-free schedulers will have collision victims. However, the AVAILABLE lines originating from the select-free schedulers may pass through the baseline schedulers, and may be speculative. Therefore, pileup victims may reside in either type of scheduler. Hence, instructions from all schedulers should check the scoreboard 114.

The select logic for both the select-free scheduler and the baseline scheduler may be implemented with any type of scheduling window including distributed, unified, and semi-unified. In a distributed scheduling window, each functional unit has a separate scheduler and wakeup array. Distributed scheduling windows generally have the fastest schedulers because the wakeup arrays are small and the select logic must only pick 1 instruction per cycle. Unified (or semi-unified) scheduling windows, use one scheduler to pick several instructions per cycle to execute on multiple functional units. Unified (or semi-unified) scheduling windows may be slower than distributed scheduling windows, but they eliminate the load balancing problems present in distributed scheduling windows.

An instruction should be steered to a functional unit that can execute it. Consequently an instruction should be steered to a scheduler feeding that type of functional unit. Any method of steering instructions may be employed including using a switch before the issue stage and using a trace cache that can reorder the instructions.

Collision Avoidance Techniques

Collision avoidance techniques may be employed with the select-free scheduler to avoid creating collision and pileup victims. Collision avoidance techniques include employing Select-N Schedulers and using Predict Another Wakeup (PAW).

Select-N schedulers can select more than one instruction per cycle. For select-1 schedulers, there is a collision when 2 or more instructions request execution. For select-2 schedulers, there is a collision when 3 or more instructions request execution. As the number of instructions selected increases and the total number of schedulers decreases, the probability of a collision decreases. To demonstrate this, three machines were simulated, each with eight functional units and the same size scheduling window. The first had eight select-1 schedulers, the second had four select-2 schedulers, and the third had two select-4 schedulers. For an average cycle, the probability of a collision in any scheduler for the machine with select-1 schedulers was 39%, for the machine with select-2 schedulers was 26%, and for the machine with select-4 schedulers was 15%. Although select-2 and select-4 logic are more complex than select-1 logic, select-free scheduling allows this logic to be pipelined with little loss in IPC.

Figure 7:
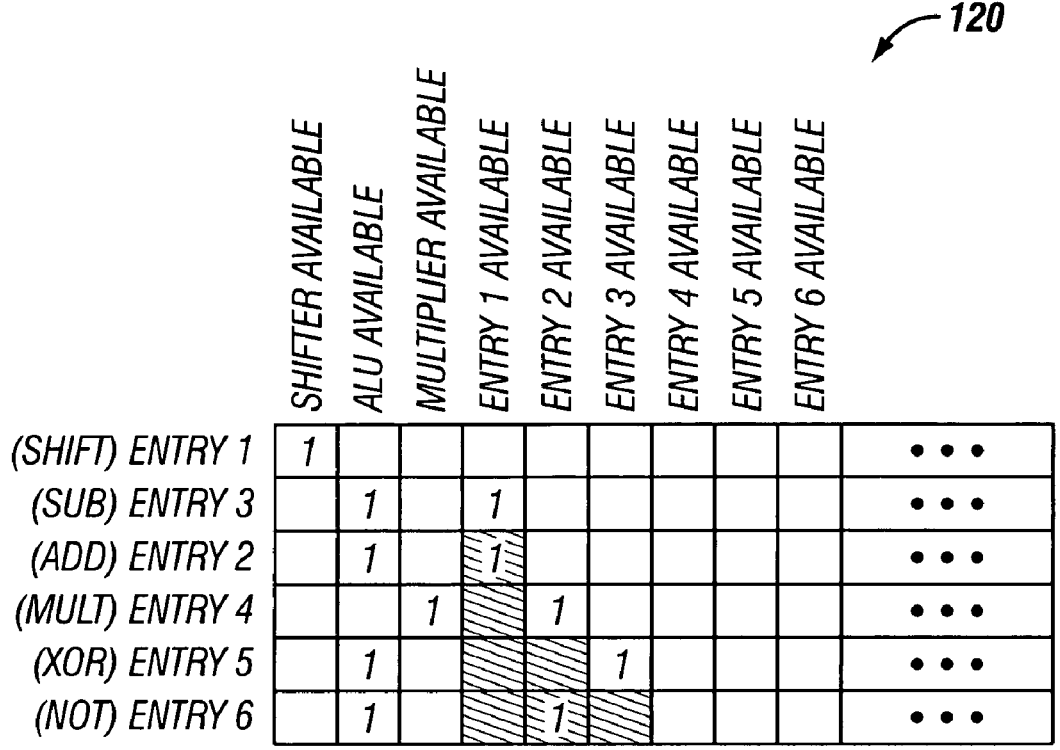
FIG. 7 shows a wakeup array that includes PAW collision avoidance.
Figure 8:
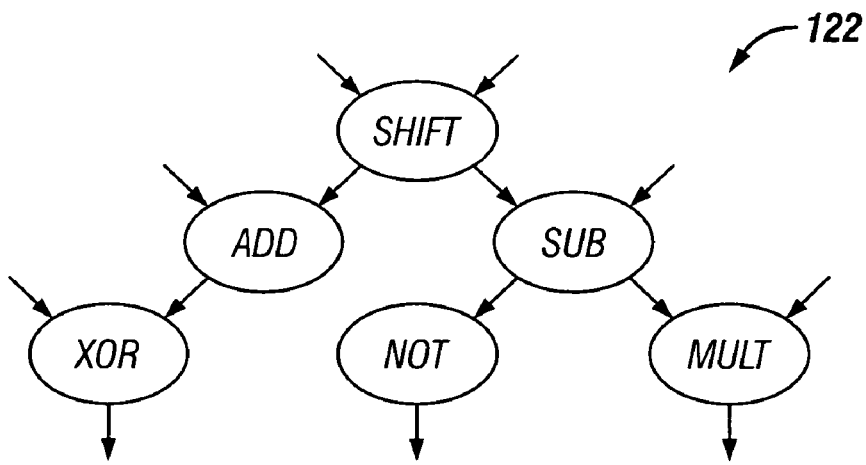
FIG. 8 a dependency graph associated with FIG. 7.

Using the PAW technique may reduce the collision rate by over 50%. When using PAW, an instruction that can determine that another instruction in the same wakeup array either will wakeup or may potentially wakeup at the same time as itself, may avoid a collision by delaying its execution request. FIG. 7 shows an example of a wakeup array 120 with PAW vectors for the instructions of the dependency graph 122 shown in FIG. 8. In this example, the ADD instruction will wakeup at the same time as the SUB instruction. If the wakeup logic of the ADD instruction knows that this will happen, the associated execution request may be delayed. To detect that an instruction in the same wakeup array 120 might potentially wake up, operands required by older instructions may be monitored to determine when those operands become available. The operands may be monitored by using a bit vector, called the PAW vector, which indicates the sources needed by older instructions in the wakeup array 120. The PAW vector may include all of the sources for all of the older instructions in the wakeup array 120 or merely a subset of the sources for a subset of the older instructions.

Like the Resource Vector, each bit position of the PAW vector corresponds to a particular resource. A bit may be set if there is an older instruction in the wakeup array requiring the resource. The "ones" in the wakeup array 120 indicate the bits of the Resource vectors that are set. The shaded portions indicate the bits of the PAW vectors that are set.

Instructions should not request execution when any of the resources marked in the PAW vector first become available. Each time one of these resources becomes available, an awake instruction should delay its execution request one cycle. For example, the ADD instruction will not request execution the first cycle that the ENTRY 1 (SHIFT) AVAILABLE line is asserted even though the ADD instruction will be ready to execute, because the SUB instruction also wakes up this cycle. If the AVAILABLE line of the ADD instruction becomes asserted the cycle after the AVAILABLE line of the SUB instruction becomes asserted, the NOT will delay its request for 2 cycles after it wakes up.

The PAW vector for each instruction may be computed in the rename stage by including one register in the rename stage per wakeup array. The register contains the PAW vector for the next instruction to be placed in that array. The instruction first reads the register to determine the PAW vector, and then updates the register by ORing the register with the portion of the instruction Resource Vector marking the source operands of the instruction. When AVAILABLE lines are first asserted, the resource bits corresponding to those lines are cleared from the register.

The wakeup logic for each entry is also modified from the wakeup logic used for select-free scheduling that does not include PAW. For example, the request line can only be asserted if the bitwise AND of the PAW Vector and the AVAILABLE lines is zero. The PAW Vector bits should be reset when the AVAILABLE lines are first asserted to prevent further delays in requesting execution.

Response to Collisions

The select-free scheduler may respond to collisions by employing a range of techniques that include having collision and pileup victims reset their SCHEDULED bits when they are in the COLLISION VICTIM vector or they fail the scoreboard check, flush and reschedule all instructions from all stages of the scheduling pipeline as soon as a collision is detected in the last stage of the select logic, and flush only collision victims and instructions in the scheduling pipeline that are dependents of collision victims as soon as a collision is detected.

Scheduler Configurations

It is possible to design schedulers that pick more than one instruction per cycle to execute on multiple functional units. A distributed scheduling window, where each functional unit has a separate scheduler and reservation station, will have the fastest schedulers because the reservation stations are small and the scheduler must only pick 1 instruction per cycle. Unified scheduling windows, which use one scheduler to pick several instructions per cycle, may eliminate the load balancing problems present in distributed scheduling windows although they may be slower.

System Configurations

Select-free schedulers may be combined in a system with other schedulers such as the baseline scheduler. For example, it may be advantageous to use fast schedulers such as select-free schedulers for functional units that execute single-cycle operations, and slow schedulers for functional units that execute long-latency operations. The fast and slow schedulers may have the same total scheduling latency (i.e. the time required for both wakeup and select). One of the differences between the two types of schedulers is the time between when a scheduler schedules an instruction and when the dependents of the instruction can be scheduled. In other words, the latency of the scheduler critical loop. This latency is lower for the fast scheduler than for the slow scheduler. In general, the latency of a scheduler's critical loop should be less than or equal to the latency of the functional unit it feeds in order to prevent the insertion of bubbles into the execution pipeline.

One exception to this rule occurs with instructions that do not produce register results, such as most branches. Since these instructions have no instructions that depend on them via registers, the latency of the critical loop in the scheduler has absolutely no impact on performance. Hence, these instructions can be scheduled using a slow scheduler.

Another exception occurs with instructions that do not produce critical results. These instructions might also be scheduled using a slow scheduler. Slow schedulers may also be used to save power or allow larger scheduling windows.

The benefits provided by the aggressive pipelining of the wakeup and select logic depends on the type of processor that is designed. If narrow-issue and high-frequency is desired, the aggressive pipelining allows deep pipelines to be constructed. If wide-issue and low-frequency is desired, the aggressive pipelining allows a large scheduling window to be constructed. If low-power is desired, the aggressive pipelining allows the scheduling window to be constructed out of slower, lower-power transistors. And, if wide-issue, high-frequency, and low-power is desired, the aggressive pipelining allows a deeply pipelined processor with a large scheduling window to be built from low-power transistors.

A number of embodiments of the invention have been described. Nevertheless, it will be understood that various modifications may be made without departing from the spirit and scope of the invention. Accordingly, other embodiments are within the scope of the following claims.

What is claimed is:

1. A processor comprising:
   a wakeup loop to hold scheduler instructions including unexecuted instructions, and to indicate ready instructions of the unexecuted instructions that may be ready to be executed;
   at least one of the unexecuted instructions to wakeup and notify at least another of the unexecuted instructions to speculatively wakeup before selection of the at least one of the unexecuted instructions is first confirmed in a select loop that confirms instruction scheduling is correct before instruction execution; and the select loop selects at least one of the ready instructions for execution.

2. The processor of claim 1 further comprising a collision handling technique.

3. The processor of claim 2 wherein the collision handling technique includes a predict another wakeup technique.

4. The processor of claim 3 wherein the predict another wakeup technique includes a PAW vector.

5. The processor of claim 2 wherein the collision handling technique includes a scoreboard to indicate whether dependent instructions of an executed instruction have executed.

6. The processor of claim 5 wherein a pileup victims vector is computed based on the scoreboard.

7. The processor of claim 1 wherein the scheduler instructions include executed instructions.

8. The processor of claim 1 wherein the select loop generates a collision victim vector to identify collision victims.

9. The processor of claim 8 wherein the collision victim vector is communicated to the wakeup loop.

10. The processor of claim 1 wherein the wakeup loop includes:
a wakeup array to hold the scheduler instructions; and
wakeup logic to indicate the at least one of the unexecuted instructions that may be ready to be selected for execution.

11. The processor of claim 10 wherein the wakeup array includes:
a resource vector corresponding to each of the scheduler instructions to indicate dependencies upon resources; and
a PAW vector to indicate the resources needed by earlier instructions in the wakeup array.

12. The processor of claim 10 wherein the wakeup logic is selected from the group consisting of AND/OR array logic, CAM-style logic, and RAM-style logic.

13. The processor of claim 1 wherein the select loop includes select logic to generate a grant vector indicating at least one of the unexecuted, ready instructions is granted execution.

14. The processor of claim 1 wherein the wakeup loop is pipelined over at least two cycles.

15. A system comprising:
a random access memory device; and
a processor in communication with the random access memory device, the processor including:
a wakeup loop to hold scheduler instructions including unexecuted instructions, and to indicate ready instructions of the unexecuted instructions that may be ready to be executed;
at least one of the unexecuted instructions to wakeup and notify at least another of the unexecuted instructions to speculatively wakeup before selection of the at least one of the unexecuted instructions is first confirmed in a select loop that confirms instruction scheduling is correct before instruction execution; and the select loop selects at least one of the ready instructions for execution.

16. The system of claim 15 including further comprising a collision handling technique.

17. The processor of claim 16 wherein the collision handling technique includes a predict another wakeup technique.

18. The processor of claim 17 wherein the predict another wakeup technique includes a PAW vector.

19. The processor of claim 16 wherein the collision handling technique includes a scoreboard to indicate whether dependent instructions of an executed instruction have executed.

20. The processor of claim 19 wherein a pileup victims vector is computed based on the scoreboard.

21. The processor of claim 15 wherein the scheduler instructions include executed instructions.

22. The processor of claim 15 wherein the select loop generates a collision victim vector to identify collision victims.

23. The processor of claim 22 wherein the collision victim vector is communicated to the wakeup loop.

24. A method of issuing requesting instructions to an execution unit, comprising:
speculatively setting an indicator to indicate a requesting instruction is ready to be selected for execution, said speculatively setting being caused by a prior wakeup of an earlier instruction and before selection of the earlier instruction is first confirmed in a select loop that confirms instruction scheduling is correct before instruction execution, the requesting instruction being a dependent of the earlier instruction;
during a cycle, selecting a predetermined number of the requesting instructions having a set indicator; and
resetting the indicator of the requesting instructions that are selected.

25. The method of claim 24 wherein the predetermined number of selected instructions is one.

26. The method of claim 24 further comprising handling collisions.

27. The method of claim 26 wherein handling collisions includes generating a collision victims vector.

28. The method of claim 26 wherein handling collisions includes generating a pileup victims vector.

29. The method of claim 28 wherein generating a pileup victims vector includes reading a scoreboard and identifying pileup victims based upon the scoreboard.

30. The method of claim 26 further comprising delaying setting the indicator based on predicting wakeup of another instruction.

31. A method of issuing unexecuted instructions to an execution unit, comprising:
generating resource vectors corresponding to the unexecuted instructions, the resource vectors including resource indicators to indicate availability of resources;
speculatively setting the resource indicators to indicate resources associated with corresponding ones of the unexecuted instructions are available so that the corresponding ones of the unexecuted instructions are ready to be executed, said speculatively setting being caused by a prior wakeup of one or more earlier instructions and before selection of the one or more earlier instructions is first confirmed in a select loop that confirms instruction scheduling is correct before instruction execution; and
selecting a predetermined number of the corresponding ones of the unexecuted instructions.

32. The method of claim 31 further comprising resetting the resource indicators corresponding to the unexecuted instructions that are selected.

33. The method of claim 31 wherein the predetermined number of selected instructions is one.

34. The method of claim 31 further comprising handling collisions.

35. The method of claim 34 wherein handling collisions includes generating a collision victims vector.

36. The method of claim 34 wherein handling collisions includes generating a pileup victims vector.

37. The method of claim 36 wherein generating a pileup victims vector includes reading a scoreboard and identifying pileup victims based upon the scoreboard.

38. The method of claim 34 further comprising delaying setting the resource indicators based on predicting wakeup of another instruction.

* * * * *